United States Patent [19]

Vuitel et al.

[11] Patent Number: 5,693,582
[45] Date of Patent: Dec. 2, 1997

[54] PROCESS FOR CATALYST REGENERATION

[75] Inventors: Charles Arthur Vuitel, Kingwood; Rong-Her Jean, Sugar Land, both of Tex.

[73] Assignee: Shell Oil Company, Houston, Tex.

[21] Appl. No.: 802,493

[22] Filed: Feb. 20, 1997

Related U.S. Application Data

[63] Continuation of Ser. No. 407,731, Mar. 20, 1995.
[51] Int. Cl.$^6$ .............. B01J 20/34; B01J 38/30; B01J 38/12
[52] U.S. Cl. .................. 502/41; 502/38; 502/56
[58] Field of Search .................. 502/38, 41, 56

[56] References Cited

U.S. PATENT DOCUMENTS

| | | |
|---|---|---|
| 3,647,714 | 3/1972 | White . |
| 3,795,487 | 3/1974 | Tamalet ............... 23/284 |
| 4,007,131 | 2/1977 | Gillespie et al. ............ 252/419 |
| 4,026,821 | 5/1977 | Schoofs et al. ............ 252/419 |
| 4,068,389 | 1/1978 | Staffin et al. ................ 34/57 |
| 4,435,281 | 3/1984 | Vasalos ..................... 502/52 |
| 4,438,288 | 3/1984 | Imai et al. ................. 585/379 |
| 4,578,370 | 3/1986 | Greenwood ................ 502/37 |
| 4,621,069 | 11/1986 | Ganguli ..................... 502/45 |
| 5,004,718 | 4/1991 | Ishida et al. ............... 502/217 |
| 5,108,968 | 4/1992 | Ellingham et al. ........... 502/43 |

FOREIGN PATENT DOCUMENTS

| | | |
|---|---|---|
| 2304396 | 3/1975 | France . |
| 21437518 | 5/1985 | United Kingdom . |
| 92/10511 | 2/1992 | WIPO . |

*Primary Examiner*—Glenn A. Caldarola
*Assistant Examiner*—Alexander G. Ghyka
*Attorney, Agent, or Firm*—Pamela J. McCollough

[57] ABSTRACT

A process for regenerating used catalysts having deposited on their surface contaminants comprising carbonaceous and/or sulfur-containing materials which comprises:

a) contacting said particles in a fluidized bed with an oxygen-containing gas at an elevated temperature for a time which does not exceed about twenty minutes wherein at least about fifty percent by weight of the sulfur contaminants are removed, and b) passing the thus treated catalyst particles to a moving belt and causing the belt to move said catalyst particles through a furnace for at least about two hours, wherein said furnace is maintained at a temperature sufficient to remove the remaining portion of the contaminants from the particles.

9 Claims, No Drawings

PROCESS FOR CATALYST REGENERATION

This is a continuation of application Ser. No. 08/407,731, filed Mar. 20, 1995.

FIELD OF THE INVENTION

This invention relates to a process for regenerating used hydroprocessing catalysts having contaminants comprising carbonaceous and/or sulfur-containing materials deposited on their surface.

BACKGROUND OF THE INVENTION

A number of catalytic processes are used in the petroleum and petrochemical industries for purposes of treating and converting process streams into a variety of useful products. Among the refining processes utilizing catalysts are cracking, hydrocracking, hydrodesulfurization, hydrodenitrification and reforming. The catalysts used in these processes decline in activity and/or selectivity during the course of use as a result, in major part, of an accumulation of carbonaceous materials commonly containing hydrogen and sulfur on the surface of the catalyst.

Catalysts deactivated by carbonaceous materials deposition can be regenerated by in-situ carbon burn-off in a controlled oxidative atmosphere in a fixed bed apparatus or a fluidized bed apparatus. For example, U.S. Pat. No. 4,007,131, discusses a process for regenerating catalyst from hydroprocessing operations by passing hot inert gas containing 0.1–4.0 % volume oxygen through the catalyst while in-situ in the reactor. Such in-situ regeneration, however, requires shutdown of the reactor for the time period needed to perform the regeneration, which may require many days. In addition, some channelling of the hot gas flow in the catalyst bed usually occurs and results in undesired variation in the degree of regeneration obtained. Thus, more effective external catalyst regeneration processes not involving extensive reactor downtime have been sought. However, available external type commercial catalyst regeneration processes have not been entirely satisfactory due to lack of total control over gas temperatures, oxidative atmospheres and physical breakage. Catalysts regenerated by these processes often have incomplete recovery of surface area and pore volume, a high content of residual sulfur and carbon, and substantial fines losses, etc. This situation arises because heat is necessary to remove contaminants, yet excessive heat causes collapse of pore structure, loss of surface area and agglomeration of metals. Release of contaminants from deep in the catalyst pores of ten requires a long "heat soak" period in order to achieve high removals. Accomplishing the conflicting objectives of surface area retention which suggests controlled heat for a short time and complete removal of carbon which suggests longer times, has long been an elusive goal. Thus, it would be advantageous to have a catalyst regeneration process whereby the recovery of catalytic and physical properties as well as the levels of contaminant removal are enhanced.

It has now been found that a process for regenerating catalysts which comprises subjecting a spent catalyst to a fluidized bed treatment step followed by a moving belt treatment step results in a regenerated catalyst from which the contaminants have been removed and the physical properties of the catalyst have been substantially recovered and/or enhanced.

SUMMARY OF THE INVENTION

The present invention therefore relates to a process for regenerating used catalysts having deposited on their surface contaminants comprising carbonaceous and/or sulfur-containing materials which comprises:

a) contacting said particles in a fluidized bed with an oxygen-containing gas at an elevated temperature for a time which does not exceed about twenty minutes wherein at least about fifty percent by weight of the sulfur contaminants are removed, and b) passing the thus treated catalyst particles to a moving belt and causing the belt to move said catalyst particles through a furnace for at least about two hours, wherein said furnace is maintained at a temperature sufficient to remove the remaining portion of the contaminants from the particles.

DESCRIPTION OF THE PREFERRED EMBODIMENTS

The present process provides a process in which a used hydroprocessing catalyst deactivated by deposition of carbonaceous materials and sulfur-containing compounds on the surface of the catalyst particles is regenerated by a two step process. The first step of the regeneration process is a fluidized bed treatment, and the second step is a moving belt treatment. A combination of these steps results in regenerated catalysts which show low attrition, i.e., little or no reduction in length of the particles. In some cases, enhanced surface areas can also be seen. In addition, in the process of the present invention, the throughput is doubled and the end result is a much more optimal regeneration process.

The regeneration process of the present invention is particularly suitable for regenerating hydroprocessing catalysts, especially hydrotreating catalysts. These catalysts typically comprise Group VIB, VIIB, VIII metals, or mixtures of two or more of these metals supported on various supports such as, for example, alumina, silica, silica-alumina, aluminosilicates, zeolites, and the like. The catalysts typically have a cylindrical, spherical or multi-lobe shape, a diameter ranging from about 0.50 millimeters to about 3.5 millimeters, and a length between about 1.5 millimeters and about 6.5 millimeters.

The first step of the regeneration process of the present invention is a fluidized bed treatment. Briefly, a fluidized bed consists of a mass of particles contained in a chamber through which a gas is passed. The particles are typically heated and if the velocity of the gas entering the chamber is properly adjusted, the particles separate and move about in a random manner such that the entire bed behaves like a liquid.

In the present invention, the spent catalyst is placed in a fluidized bed apparatus or chamber of any suitable construction and is supported on a bottom plate or other suitable device having a plurality of ports designed to permit flow of an oxygen-containing gas upwardly and to prevent the catalyst particles from moving downwardly such that the flow of gas would be restricted. The oxygen-containing gas is normally introduced into the chamber prior to the introduction of material to be treated. The oxygen content of the gas can vary in the range of from about 4 percent by volume to about 90 percent by volume. Preferably, the oxygen component of the gas stream is from about 4 to about 30 percent by volume, and more preferably from about 15 to about 22 percent by volume. A convenient gas stream is atmospheric air, although pure oxygen may also be utilized. After the oxygen-containing gas is passed upwardly through the ports into the chamber and contacted with the spent catalyst particles, the exhaust gas exits the chamber for conventional treatment such as, for example, it may be passed to equipment downstream for discharge by procedures well known in the art.

The velocity of the gas stream must be sufficiently high for the catalyst particles to remain in suspension in the chamber. The minimum velocity is that needed to overcome the gravitational pull on the catalyst particles. The velocity may not be so high that catalyst particles are transported out of the chamber. The oxygen-containing gas is preferably introduced into the chamber at a superficial velocity in the range of from about 40 feet per minute (ft/min) to about 1600 ft/min.

Generally, the oxygen-containing gas is introduced into the chamber at a temperature sufficient to initiate the desired reaction in the column, and is desirable that the temperature of the gas stream in the chamber be maintained constant at the temperature it was introduced. Therefore, the temperature of the gas at the inlet is adjusted so that the temperature of the chamber is maintained at the desired temperature, i.e., a temperature in the range of from about 400° F. to 1100° F., preferably from about 750° F. to about 950° F. The pressure in the chamber is typically atmospheric pressure.

After the gaseous atmosphere has been established at the desired temperature and velocity, the spent catalyst materials are added to the chamber. The residence time of the catalyst in the fluidized bed apparatus or chamber is typically from about 1 minute to about 20 minutes, preferably from about 5 minutes to about 15 minutes. These residence times at the temperatures specified above result in the removal from the spent catalyst of at least about 50 percent by weight of the sulfur contaminants. The first step, i.e., the fluidized bed step, of the regeneration process also results in the removal of from about 5 percent by weight to about 40 percent by weight of the carbon contaminants and from about 25 percent by weight to about 50 percent by weight of the total volatilities present on the spent catalyst. Preferably, at least about 55 percent by weight of the sulfur contaminants, and from about 10 percent by weight to about 25 percent by weight of the carbon contaminants, and from about 30 percent by weight to about 40 percent by weight of the total volatilities present on the spent catalyst are removed during the fluidized bed treatment. As one skilled in the art would readily recognize, the above-described fluidized bed treatment is quite effective for removing contaminants from used or spent catalysts, but the constant agitation is quite abrasive and thus detrimental to the integrity of the catalysts. Thus, if the catalysts are subjected to such a treatment for prolonged periods of time, attrition becomes a significant problem. For this reason, the present invention is a process in which the most volatile portion of the contaminants are removed in a first step to control the exotherm, i.e., a fluidized bed treatment, and the remainder of the contaminants are removed in a second step, i.e., a moving belt treatment, in which there is a minimal amount of catalyst particle motion.

Following the fluidized bed treatment, the spent or used catalyst is subjected to a moving belt treatment. In this second step of the regeneration process of the present invention, catalyst particles are withdrawn from the fluidized bed apparatus or chamber and transferred to a continuous belt driven by mechanical means such as, for example, a motor and which moves through a furnace. The belt is constructed of wire mesh, stainless steel and moves in a horizontal direction through a furnace such that the catalyst particles are subjected to only a minimal amount of agitation. The bed has a thickness of about ¼ of an inch to about 2½ inches, preferably from about three-fourths of an inch to about 1½ inches. As the bed containing the catalyst particles is in motion through the furnace, hot air, either in the presence or absence of combustion gases is passed through the wire mesh belt. The direction of the air flow may be upwardly or downwardly, as desired, but must flow through the moving belt containing the catalyst particles. The temperature of the air flowing upwardly through the moving belt and contacting the catalyst particles increases over a range starting with a temperature of about 700° F. and increasing up to a final temperature of about 1100° F. as the catalyst particles continue on the belt. The time required for the moving belt treatment and the removal of the remainder of the carbon and sulfur contaminants is at least about two hours, and is generally from about four hours to about eight hours.

In one embodiment, the catalyst particles are passed through a series of zones where the temperatures are controlled in each zone. In this embodiment, the zones are distinguished by physical separation means. The number of zones is typically less than 8, generally about 3 to about 8, but the number of zones utilized is not critical. In this embodiment, the catalyst residence time in each zone is maintained at the desired time by controlling the belt speed. Initially, the temperature of the air in the first zone is about 700° F. to about 900° F., preferably from about 775° F. to about 875° F. Following a residence time in each zone of about 0.5 hours to about 2 hours, the catalyst particles are passed to additional zones in which the temperature of the air is increased to about 800° F. to about 1100° F., preferably from about 810° F. to about 950° F. The total residence time for the moving belt treatment is generally in the range of from about two hours to about eight hours, although longer residence times may be utilized, if desired. The regenerated catalyst is then withdrawn from the moving belt and passed to a cooling step before packaging and return of the catalyst for reuse.

The regeneration process of the present invention is particularly advantageous from an economic standpoint for continuous operations in that the throughput can be significantly increased.

The ranges and limitations provided in the present specification and claims are those which are believed to particularly point out and distinctly claim the present invention. It is, however, understood that other ranges and limitations which perform substantially the same function in the same or substantially the same manner to obtain the same or substantially the same result are intended to be within the scope of the instant invention as defined by the present specification and claims.

The process of this invention will be further described by the following embodiments which are provided for illustration and are not to be construed as limiting the invention.

Illustrative Embodiments

The following Example and Comparative Examples utilized spent/used catalysts having the following characteristics:

| Catalyst Composition | Ni/Mo on $Al_2O_3$ |
| --- | --- |
| Carbon, % wt. | 10.3 |
| Sulfur, % wt. | 6.4 |
| Surface area, $m^2/g$.[1] | 230 |
| Attrition Index[2] | 53. 4 |

[1]Surface area is determined by the B.E.T. method for determining specific surface area as described in Brunauer, S., Emmet, P. Y. and Teller, E., J. Am. Chem. Soc., 60, 309–316 (1938).
[2]Attrition index is defined as the number percent of particles which are less than the averaged length of 2.5 millimeters.

EXAMPLE 1

Spent catalysts having the above characteristics were regenerated using the process of the present invention. The conditions used were as follows:

The gas atmosphere, i.e., air containing 21 volume percent of oxygen, was entered into a fluidized bed chamber, i.e. pretreater, at a superficial velocity of 430 ft/min and an initial temperature of 950° F. The fluidized bed chamber had a staggered, perforated type of distributor plate at the bottom, a reaction zone having an 18 inch diameter and a height of 5 feet, three inches, a transition zone of conical shape having 45° included angles and having a height of 11.25 inches, and a disengagement zone having a diameter of 36 inches and a height of 3 feet. There was a cyclone downstream and a wet scrubber for collecting fine catalyst particles entrained from the fluidized bed chamber and for removing the sulfur dioxide produced in the pretreater.

The spent catalysts, having a trilobe shape averaging 1/20 inch in diameter and 2.5 millimeters (mm) in length, were fed continuously from a three inch pipe on one side of the disengagement section. The partially regenerated catalysts were discharged continuously from a six inch pipe on the opposite side of the reaction zone. The catalyst discharge rate was controlled by means of a flapper valve, while the spent catalyst feed rate was controlled using a vibrator connected to a hopper. The bed height of the catalyst in the pretreater was maintained at about six inches.

Initially, forty-three pounds of regenerated catalysts were charged to the pretreater for facilitating control of the 5 initial reactor temperature. In order to achieve a steady state, prior to the fluidized bed treatment step, the spent catalyst feed rate and the discharge rate were set at about 2.2 lb/min. The inlet air temperature was then gradually decreased from 950° F. to 870° F. after 20 minutes of start-up. The feed and discharge rate were then reset to about 4.3 lb/min (10 minute residence time) and the inlet air temperature was gradually reduced to about 560° F. One drum of partially regenerated catalysts was collected at 60 minutes after the start-up. The feed and the discharge rate were then further increased to about 5.5 lb/min (7.8 minute residence time), and the inlet air temperature was maintained at about 560° F. Another drum of the partially regenerated catalysts was collected at 120 minutes after the start-up. The catalyst temperature inside the fluidized bed pretreater fluctuated from 740° F. to 780° F. when both drums of catalysts were collected. For the first drum, the sulfur content from this step was 2.6wt %, i.e., 59 wt % of the sulfur contaminants had been removed, and the carbon content was 8.6 wt %, i.e., 16.5 wt % of the carbon contaminants had been removed. For the second drum, the sulfur content was 2.7 wt %, i.e., 58 wt % of the sulfur contaminants had been removed, and the carbon content was 8.6 wt i.e., 16.5 wt % of the carbon contaminants had been removed .

The drums of partially regenerated catalysts from the pretreater were then sent to the moving belt for the second step of the regeneration process. The catalyst passed through Zone 1 which had a temperature ranging from 810° F. to 830° F., Zone 2 which had a temperature ranging from 720° F. to 820° F, Zone 3 which had a temperature ranging from 810° F. to 850° F., and Zone 4 which had a temperature ranging from 810° F. to 860° F. The catalyst bed thickness on the belt was maintained at about three-quarters of an inch and the belt speed corresponded to a production rate of 7500 pounds per day.

The results are presented in Table 1 below.

COMPARATIVE EXAMPLE A

Spent catalysts having the above characteristics were regenerated using a fluidized bed process, but not a moving belt process. The conditions used were as follows:

The catalysts remaining in the pretreater in Example 1 above were gradually heated from a temperature of 740° F. up to a temperature of 900° F. over a period of about seventy-five minutes. The superficial air velocity in the reactor was maintained at about 430 ft/min during the remaining regeneration process.

The results are presented in Table 1 below.

COMPARATIVE EXAMPLE B

Spent catalysts having the above characteristics were regenerated using a moving belt process, but not a fluidized bed process. The conditions used were as follows:

The catalyst temperature ranged from 700° F. to 840° F. in Zone 1, from 780° F. to 820° F. in Zone 2, from 810° F. to 900° F. in Zone 3, and from 640° F. to 900° F. in Zone 4. The catalyst bed depth was again about three-quarters of an inch, and the belt speed corresponded to a production rate of 3500 pounds per day.

The results are presented in Table 1 below.

TABLE 1

|  | Ex. 1 | Comp. Ex. A | Comp. Ex. B |
| --- | --- | --- | --- |
| Carbon, % wt. | 0.2 | 0.1 | 0.9 |
| Sulfur, % wt. | 0.3 | 0.5 | 0.8 |
| Surface area, $m^2/g$.[1] | 229 | 228 | 233 |
| Attrition Index[2] | 54.2 | 57.4 | 63.0 |

[1] Surface area determined by the B.E.T. method for determining specific surface area as described in Brunauer, S., Emmet, P. Y. and Teller, E., J. Am. Chem. Soc., 60, 309–316 (1938).
[2] Attrition index is defined as the number percent of particles which are less than the 2.5 millimeters averaged length. The number percent is 53.4 for spent/used catalysts as indicated in the table above summarizing the characteristics of the spent catalyst.

As can be seen in Table 1, the spent catalyst regenerated according to the present invention (Example 1) has a much lower attrition index than catalysts regenerated using a fluidized bed process alone (Comparative Example A) and catalysts regenerated using a moving belt process alone (Comparative Example B). It is also noted that the temperature fluctuated significantly in most of the zones where a moving belt process alone (Comparative Example B) was utilized, whereas the temperature variation was substantially less in most of the zones in the process of the present invention (Example 1). This is due to the fact that in the process according to the invention (Example 1), the exotherm was removed in the first step of the process, i.e., the fluidized bed treatment step, thereby rendering better temperature control in the second step of the invention, i.r., the moving belt treatment step.

What is claimed is:

1. A process for regenerating used hydroprocessing catalyst particles, wherein said catalyst particles comprise Group VIB, VIIB, VIII metals or mixtures thereof, said catalyst particles having deposited on their surface contaminants comprising carbonaceous and/or sulfur-containing materials which comprises:

a) contacting said catalyst particles in a fluidized bed with an oxygen-containing gas at a temperature in the range of from about 400° F. to about 1100° F. for a time which does not exceed about twenty minutes wherein at least about fifty percent by weight of the sulfur contaminants are removed, and b) passing the thus treated catalyst particles to a moving belt and causing the belt to move said catalyst particles through a furnace for at least about two hours, wherein said furnace is maintained at a temperature in the range of from about 700° F. to about 1100° F., wherein the remaining portion of the contaminants is removed from the particles.

2. The process of claim 1 wherein about 5 percent by weight to about 40 percent by weight of the carbon contaminants are removed in step a).

3. The process of claim 1 wherein the temperature in step a) is in the range of from about 750° F. to about 950° F.

4. The process of claim 1 wherein said oxygen-containing gas is selected from the group consisting of air, pure oxygen and mixtures thereof.

5. The process of claim 1 wherein the furnace in step b) is maintained at a temperature in the range of from about 700° F. to about 950° F.

6. The process of claim 1 wherein step b) is carried out using a series of zones wherein the temperature is increased in each successive zone.

7. The process of claim 6 wherein the number of zones is in the range of from about three to about eight.

8. The process of claim 1 wherein said particles remain in the furnace for about two to about eight hours.

9. A process for regenerating used hydroprocessing catalyst particles, wherein said catalyst particles comprise Group VIB, VIIB, VIII metals or mixtures thereof, said catalyst particles having deposited on their surface contaminants comprising carbonaceous and/or sulfur-containing materials which comprises:

a) contacting said catalyst particles in a fluidized bed with an oxygen-containing gas at a temperature in the range of from about 400° F. to about 1100° F. for a time which does not exceed about twenty minutes wherein at least about fifty percent by weight of the sulfur contaminants are removed, and b) passing the thus treated catalyst particles to a moving belt and causing the belt to move said catalyst particles through a furnace through a furnace for about two to about eight hours, wherein said furnace is maintained at a temperature in the range of from about 700° F. to about 1100° F., wherein said temperature is sufficient to remove the remaining portion of the contaminants from the particles.

* * * * *